United States Patent [19]
Coffer

[11] Patent Number: 4,940,019
[45] Date of Patent: Jul. 10, 1990

[54] RECYCLING BIRD FEEDER

[76] Inventor: Jerry W. Coffer, 3207 S.E. 36th, Portland, Oreg. 97202

[21] Appl. No.: 201,075

[22] Filed: May 31, 1988

[51] Int. Cl.$^5$ .............................................. A01K 39/01
[52] U.S. Cl. .................................... 119/522; 119/57.8
[58] Field of Search ............... 119/51 FS, 51 R, 52 R, 119/61, 52.2, 52.4, 57.8

[56] References Cited

U.S. PATENT DOCUMENTS

| | | | |
|---|---|---|---|
| 1,587,548 | 6/1926 | Olson | 119/51 FS |
| 2,532,726 | 12/1950 | Lajoie et al. | 119/52 R |
| 4,215,652 | 8/1980 | Kerscher | 119/52 R |
| 4,327,669 | 5/1982 | Blasbalg | 119/51 R |
| 4,532,891 | 8/1985 | Jones | 119/51 FS |
| 4,747,370 | 5/1988 | Olson | 119/52 R |

FOREIGN PATENT DOCUMENTS 135726 10/1960 U.S.S.R. ............... 119/52 R

*Primary Examiner*—John Weiss
*Attorney, Agent, or Firm*—Chernoff, Vilhauer, McClung & Stenzel

[57] ABSTRACT

A bird feeder has a vertical feed chamber with a plurality of feed openings defined in it and a perch located below each feed opening. Enclosed conduits, which have inlets that are positioned immediately below the feed openings, empty in an otherwise enclosed overflow chamber. Thus, feed material which is scratched out of the feed openings passes through the conduit into the overflow chamber. The conduit inlet opening is relatively small compared to the size of the bird eating at the feeder, which, coupled with the placement of the perch below the conduit inlet, causes hulls of seeds eaten by the bird and fecal matter dropped by the bird to fall outside of the conduit so that they will not contaminate the seed contained in the overflow chamber. In one embodiment of the feeder there is a plurality of feed chambers which are oriented one on top of another. In this embodiment the conduits associated with the feed openings in each feed chamber empty into the next lower feed chamber. Thus, overflow seed is automatically recycled.

7 Claims, 2 Drawing Sheets

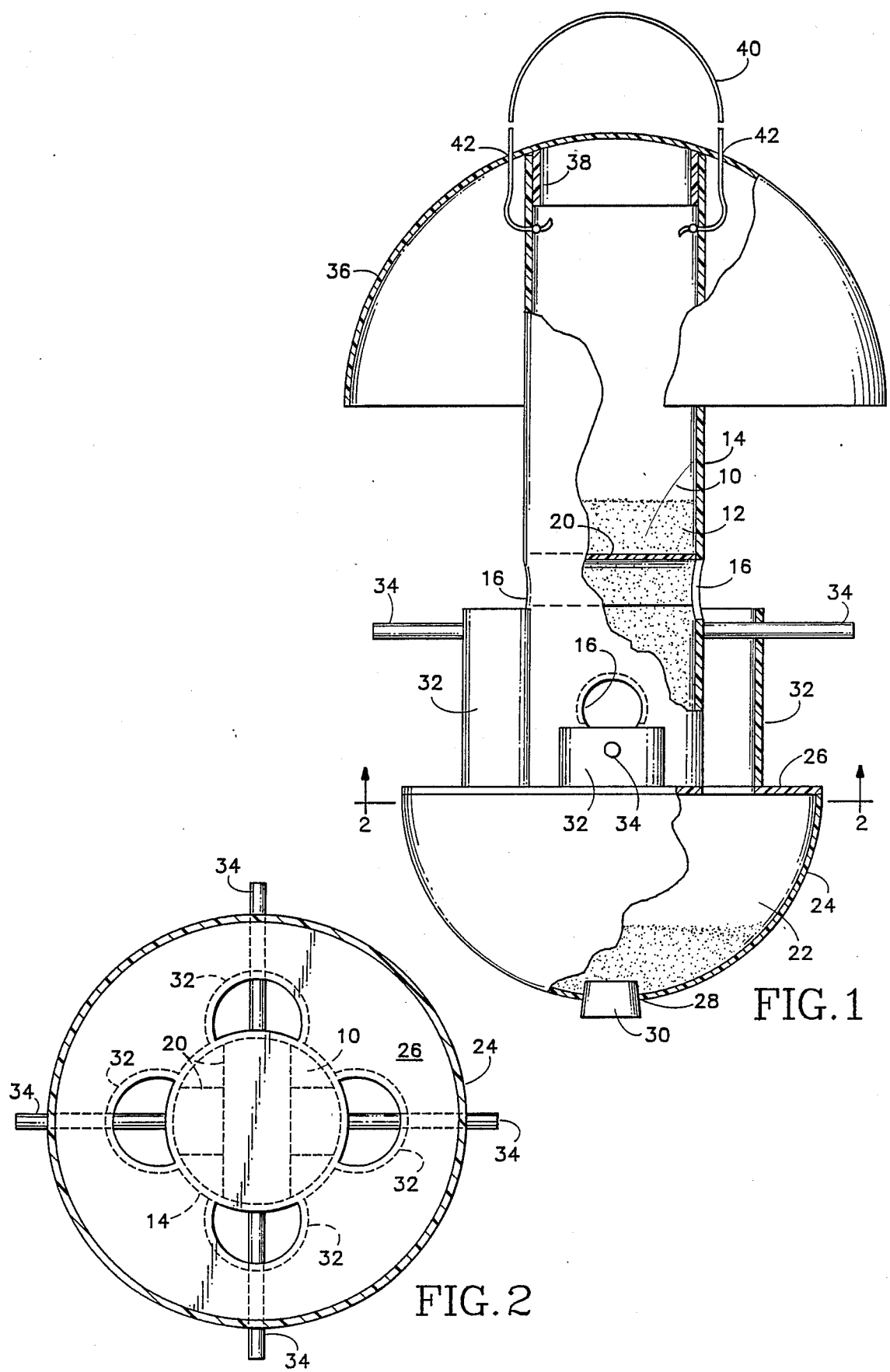

RECYCLING BIRD FEEDER

SUMMARY AND BACKGROUND OF THE INVENTION

This invention relates to a bird feeder which recycles feed material that is spilled due to the feeding action of birds, and in particular to such a device which prevents seed hulls and fecal matter which is dropped by birds feeding at the feeder from contaminating the recycled feed material.

When birds are fed particulate feed material such as seed, through openings in the sides of a vertically disposed bird feeder, a large percentage of the feed material is displaced from the feeder and falls to the ground and as a result is lost. This is because when birds eat they continuously sort through the feed material with their beaks in order to locate particularly desirable portions. This sorting, which is in the nature of a scratching action, pulls the surface layer of feed material toward the birds and thus out of the feeder. Once the feed material falls on the ground it generally will not be eaten and becomes wasted. Many birds will not eat on the ground where they are vulnerable to predators, and grass or undergrowth located under the feeder can make it difficult for those birds who will eat on the ground to find the fallen feed material. The fallen feed material not only is unavailable for feeding birds, but it can decay and cause a mess, it can attract rodents and, in the case of seed, it can sprout, which is undesirable in most garden locations.

Prior art attempts to recapture this displaced seed so that it can be recycled have largely been ineffective. The most effective devices for this purpose to date provide large lips which extend under the perches which support the birds when they are eating and catch the displaced feed materials. This lip communicates with an overflow compartment which is located below the main feed compartment of the feeder. Such devices are shown, for example, in Kerscher, U.S. Pat. No. 4,215,652 and LaJoie et al., U.S. Pat. No. 2,532,726. The difficulties with these prior art devices is that a lip located under a feeding bird catches seed hulls which are discarded by the bird and feces which are dropped by the bird as well as the unused feed material which is scratched out of the feeder. Thus, the unused feed material becomes contaminated and cannot be reused.

The feeder of the present invention overcomes the foregoing shortcomings and limitations of the prior art feeders of this type by providing an enclosed conduit for each feed opening in the feeder. Each conduit has an inlet which is positioned adjacent to the feed opening and an outlet which empties into an otherwise enclosed overflow chamber. The area of the conduit inlet is relatively small, less than double the area of the feed opening. In addition, the perch the bird rests on when eating is located below the conduit inlet. Thus, it is impossible for feces that are dropped from the bird while it is eating to fall into the conduit. Also, since the bird is positioned below and outwardly of the feed opening it must reach into the opening to pick up feed material and the normal tendency is for a bird to straighten while it eats so that it can watch for possible danger in the immediate vicinity. Thus, its head will not be over the conduit inlet when it eats and seed hulls will not drop into the inlet. As a result, only uneaten feed material which is displaced due to scratching falls into the overflow chamber, and the displaced feed material can be recycled by placing it back into the body of the feeder.

In a preferred embodiment of the feeder several feeding chambers are positioned one above another and the conduit associated with the feed openings in each of the feed chambers but the bottommost one communicate with the next lower feed chamber. Thus, feed material displaced from openings in these feed chambers falls into the next lower feed chamber where it is automatically recycled.

Accordingly, it is a principal object of the present invention to provide a vertically-walled bird feeder in which feed material that is displaced from the feeder's feed openings falls into an overflow chamber through a conduit, the size and placement of which keeps out the hulls of eaten seeds and the feces of birds feeding at the feeder from falling into it.

It is a further object of the present invention to provide such a feeder having several feed chambers which are arranged one above another and the conduits associated with the feed holes in each chamber communicate with the next lower feed chamber so that the displaced feed material is automatically recycled.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side elevation view, partially broken away to show hidden detail, of a bird feeder embodying the features of the subject invention.

FIG. 2 is a sectional view taken along the line 2—2 of FIG. 2.

PREFERRED EMBODIMENT OF THE INVENTION

Figures 3, 4:
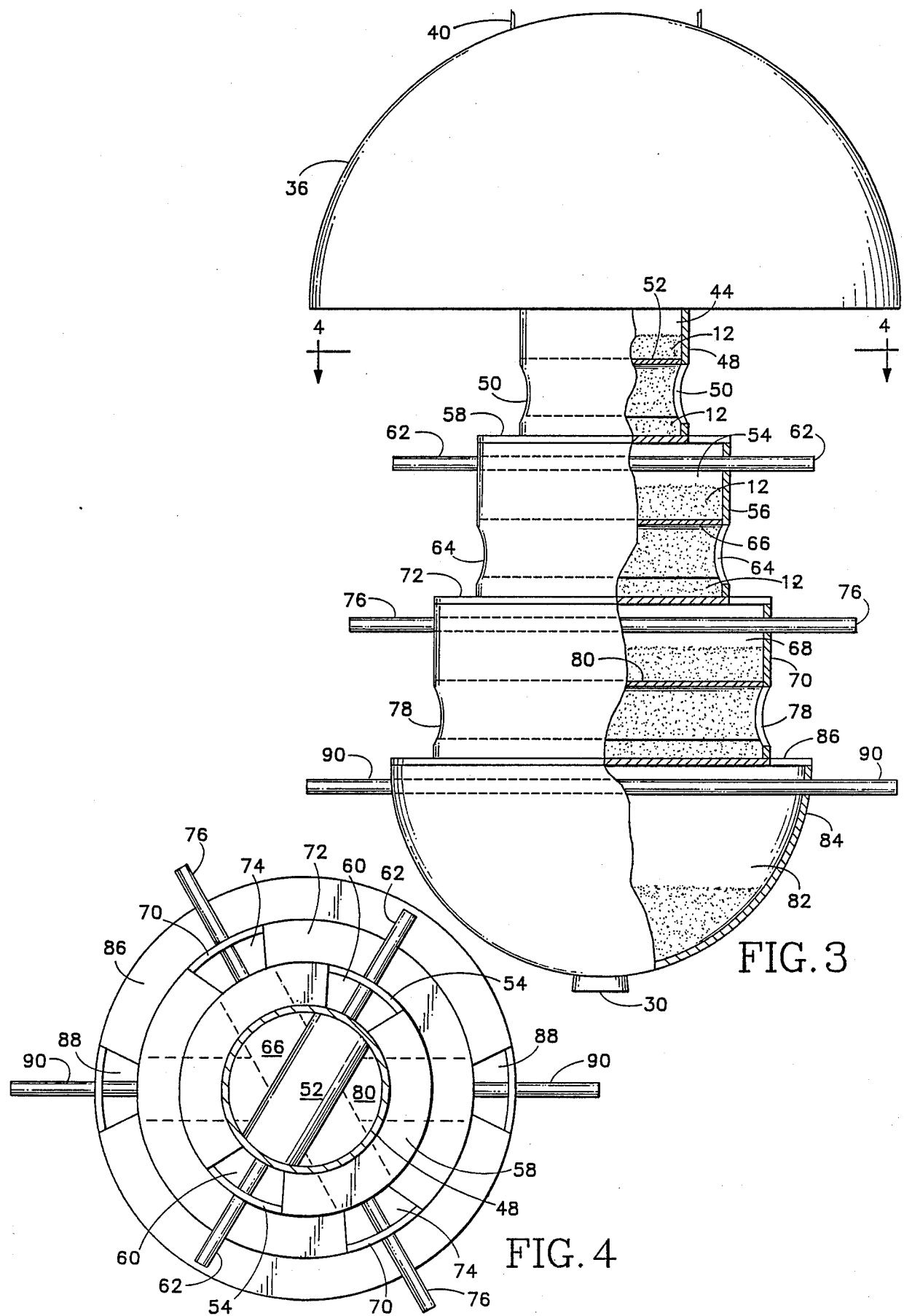
FIG. 3 is a side elevation view, partially broken away, of another embodiment of the invention.
FIG. 4 is a sectional view taken along the line 4—4 of FIG. 1.

Referring to FIGS. 1 and 2 of the drawings, the bird feeder of the present invention comprises a first chamber 10 which holds a supply of seed or similar particulate feed material 12. In the embodiment illustrated the first chamber is formed from a cylindrical tube, however, it could have other shapes as well so long as it has vertical side walls 14 which form the chamber 10. Located in the side walls 14 are a series of feed openings 16 through which a bird has access to the feed material in the chamber. In the embodiment illustrated there are four feed openings 16 which are arranged in two pairs, with the openings in each pair being diametrically opposed from one another on a common axis, and the axes of the pairs being oriented at right angle to one another. Extending between the feed openings in each pair is an open bottomed semicylindrical baffle 20 which prevents the feed material from flowing freely out of the openings.

Located below and separated from the first chamber 10 is a second chamber 22. In the embodiment illustrated the bottom of the second chamber is in the form of a semispherical dome 24 and its top is in the form of a plate 26. The side walls 14 of the first chamber are attached to the top plate 26 of the second chamber so that the top plate 26 also serves as the bottom of the first chamber 10. An opening 28 located at the bottom of the dome 24 contains a removable plug 30 which permits feed material to be removed from the second chamber.

Located below each feed opening 16 is a conduit 32, which extends through the top plate 26 and empties into the second chamber 22. Thus, any seed which is displaced from one of the feed openings 16 falls into the inlet of the conduit associated with that feed opening and falls into the second chamber 22. Extending out at the side of each conduit, below its inlet, is a perch 34 which is arranged to support a bird in a position where it can reach feed material in the feed opening. Since the perch is located below the inlet of the conduit, feces dropped by a bird while it is eating does not fall into the conduit but pass outside of the feeder. In the embodiment illustrated each conduit is formed from a semicylindrical tube segment which is attached to the side wall 14 of the first chamber and to the top plate 26. While the conduit can have almost any shape its inlet must be relatively small so that when a bird situated on the perch 34 raises its head to eat feed material obtained from the feeder, seed hulls which are discarded by the bird do not pass through the conduit but are deposited outside of the feeder. Thus, only clean reusable feed material passes through the conduit and is collected in the second chamber.

The size of birds which will eat at a feeder is established by the size of the feed openings which are located in the feeder. Thus, there is a relationship between the size of the feed openings and the size of conduit inlets which will permit the conduits to function in the manner described above. It has been found that to achieve this result the area of the conduit inlet preferably is less than double the area of the feed opening with which it is associated.

With the feeder illustrated, the top of the first chamber is covered with a dome-shaped lid 36 which is larger than the dome 24, and thus covers the inlets to the conduit and the perches 34 and keeps the entire feeding station dry in inclement weather. The dome has a tubular sleeve 38 attached to its center which slidably fits into the chamber 22. A strap 40, which is attached at both of its ends to the chamber side walls 14, extends through a pair of openings formed in the dome.

In a second embodiment of the invention shown in FIGS. 3 and 4, there are four chambers oriented one on top of another. The top three chambers all have feed openings and conduits which channel unused feed material which is displaced from a chamber into the next lower chamber. Thus, the feed material which is displaced from the top two chambers is immediately available for use in a lower chamber. As in the case with the first embodiment of the invention, feed material which passes into the bottom chamber must be removed manually and placed in the top chamber in order for it to be available for use.

In the embodiment illustrated a first chamber 44 is defined by a first cylindrical tube 48. A pair of diametrically opposed first feed openings 50 are formed in the first tube and a first semicylindrical baffle 52 extends between these feed openings. Located immediately below the first chamber 44 is a second chamber 54 which is defined by a second cylindrical tube 56. The second chamber has a larger diameter than the first chamber and its top is enclosed by a first plate 58 which also serve as the bottom of the first chamber 44. Wedge-shaped passageways 60 located in the first plate 58 immediately below the first feed openings 50 serve as first conduits which channel feed material which is spilled out of the first chamber into the second chamber. A first perch 62, which extends through the second tube, is coaxially aligned with the centers of the first feed openings. Thus, birds which are supported by this perch are positioned to obtain feed material from the first feed openings and yet discarded seed hulls and feces are dropped outside of the first conduits. The second tube 56 has a pair of diametrically opposed second feed openings 64 formed in it, and a second semicylindrical baffle 66 extends between these feed openings. The second feed openings 64 are offset from the first feed openings 50 by an angle of 120° in order that material dropped by a bird eating at the first feed openings does not drop into the second conduit, which, as will be explained later, is located below the second feed openings.

Located immediately below the second chamber 54 is a third chamber 68 which is defined by a third cylindrical tube 70. The third chamber has a larger diameter than the second chamber and its top is enclosed by a second plate 72 which also serves as the bottom of the second chamber 44. Wedge-shaped passageways 74 located in the second plate 72 immediately below the second feed openings 64 serve as second conduits which channel feed material which is spilled out of the second chamber into the third chamber 68. A second perch 76, which extends through the third tube, is coaxially aligned with the centers of the second feed openings. Thus, birds which are supported by this perch are positioned to obtain feed material from the second feed openings and yet discarded seed hulls and feces are dropped outside of the second conduits. The third tube 70 has a pair of diametrically opposed third feed openings 78 formed in it and a third semicylindrical baffle 80 extends between these feed openings. The third feed openings 78 are offset from both the first and second feed openings by a 120° angle so that material dropped from a bird eating at either the first or second feed openings will not drop into the third conduit.

Located immediately below the third chamber 68 is a fourth chamber 82 which comprises a semispherical dome 84 which is similar to the dome of the second chamber in the first embodiment of the invention. The diameter of the dome 84 is larger than the diameter of the third tube 70. The fourth chamber is enclosed on top by a plate 86, and wedge-shaped passageways 88 are located in the top plate 86 immediately below the third feed openings 78 to serve as third conduits which channel feed material which is spilled out of the third feed openings into the fourth chamber. A third perch 90, which extends through the dome 84, is coaxially aligned with the centers of the third feed openings 78. Thus, birds which are supported by this perch are positioned to obtain feed material from the third feed openings. The fourth chamber has an opening 28 and plug 30 in its bottom which permit removal of accumulated feed material from it.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A bird feeder comprising:
   (a) a first chamber for holding seed and other feed material;

(b) said first chamber having at least one feed opening defined therein to provide access to feed material contained therein;
(c) baffle means for preventing feed material from flowing freely out of said feed opening;
(d) perch means for supporting a bird, said perch means being located below said feed opening;
(e) a second chamber located below said first chamber, said second chamber having at least one second feed opening defined therein;
(f) second baffle means for preventing feed material from flowing freely out of said second feed opening;
(g) second perch means for supporting a bird, said second perch means being located blow said second feed opening;
(h) conduit means having an inlet positioned above said perch means and adjacent to said feed opening and communicating with said second chamber for passing feed material which is discharged from said feed opening by a bird into said second chamber;
(i) a third chamber located below said second chamber; and
(j) second conduit means having an inlet positioned above said second perch means and adjacent to said second feed opening in communicating with said third chamber, for passing feed material which is discharged from said second feed opening into said third chamber.

2. The bird feeder of claim 1 wherein said inlet of said second conduit means is of a size such that seed hulls and fecal matter dropped by a bird situated on said second perch means will not drop into said inlet.

3. The bird feeder of claim 2, including:
(a) a third chamber located below said second chamber;
(b) said third chamber, having at least one third feed opening defined therein, third baffle means for preventing feed material from flowing freely out of said third feed openings, and third perch means for supporting a bird located below said third feed opening;
(c) a fourth chamber located below said third chamber; and
(d) third conduit means, having an inlet positioned above said third perch and adjacent to said third feed opening and communicating with said fourth chamber, for passing feed material which is discharged from said third feed opening into said fourth chamber.

4. The bird feeder of claim 3 wherein said inlet of said conduit means is of a size such that seed hulls and fecal matter dropped by a bird situated on said third perch means will not drop into said inlet.

5. The bird feeder of claim 4 wherein said first chamber is a cylindrical tube having a first diameter, said second chamber is a cylindrical tube having a second diameter which is larger than said first diameter, and said third chamber is a cylindrical tube having a third diameter which is larger than said second diameter.

6. A bird feeder comprising:
(a) a plurality of chambers which are arranged one on top of another;
(b) each of said chambers having at least one feed opening defined therein and baffle means which prevent feed material placed in said chamber from freely flowing out of said feed opening;
(c) means for channeling feed material which is discharged from a feed opening in any of said chambers into the next chamber therebelow.

7. The bird feeder of claim 6 wherein each of said chambers comprises a cylindrical tube with each of said tubes having a diameter which is larger than the tube lying immediately above it.

* * * * *